United States Patent
Cafaro et al.

(10) Patent No.: US 8,408,842 B2
(45) Date of Patent: Apr. 2, 2013

(54) CONNECTION ARRANGEMENT FOR SUBSEA CONNECTION OF FLUID CONDUITS

(75) Inventors: Carlo Cafaro, Stavanger (NO); Ole Gabrielsen, Stavanger (NO); Per Kjetil Grude Lønning, Sandnes (NO)

(73) Assignee: Vetco Gray Scandinavia AS, Sandvika (NO)

(*) Notice: Subject to any disclaimer, the term of this patent is extended or adjusted under 35 U.S.C. 154(b) by 452 days.

(21) Appl. No.: 11/922,228

(22) PCT Filed: Jun. 13, 2006

(86) PCT No.: PCT/IB2006/001560
§ 371 (c)(1), (2), (4) Date: Aug. 10, 2009

(87) PCT Pub. No.: WO2006/134456
PCT Pub. Date: Dec. 21, 2006

(65) Prior Publication Data
US 2009/0297274 A1    Dec. 3, 2009

Related U.S. Application Data

(60) Provisional application No. 60/690,128, filed on Jun. 14, 2005.

(51) Int. Cl.
*F16L 1/12*    (2006.01)

(52) U.S. Cl. .................. 405/169; 405/158; 405/170

(58) Field of Classification Search .................. 405/158, 405/169, 170, 172, 173, 184.4, 184.5
See application file for complete search history.

(56) References Cited

U.S. PATENT DOCUMENTS

| | | | |
|---|---|---|---|
| 3,267,682 A * | 8/1966 | Robley | 405/170 |
| 4,019,334 A * | 4/1977 | Sinclair et al. | 405/169 |
| 4,140,292 A * | 2/1979 | Kaigler, Jr. | 248/49 |
| 4,231,398 A | 11/1980 | Gibbons | |
| 4,254,728 A | 3/1981 | Patinet | |
| 6,004,072 A | 12/1999 | Cunningham | |
| 6,312,193 B1 | 11/2001 | Witting et al. | |

OTHER PUBLICATIONS

PCT/ISA/210—International Search Report—Oct. 3, 2006.
PCT/ISA/237—Written Opinion of the International Searching Authority—Oct. 3, 2006.

* cited by examiner

*Primary Examiner* — Tara M. Pinnock
*Assistant Examiner* — Benjamin Fiorello
(74) *Attorney, Agent, or Firm* — Venable LLP; Eric J. Franklin (57) ABSTRACT

A connection arrangement for subsea connection of at least a first fluid conduit to a second fluid conduit. A supporting unit displaceably supports the connection arrangement against a supporting surface. A coupling device couples and secures the fluid conduits to the connection arrangement thereby interconnecting the fluid conduits to each other. A frame carries the coupling device and is slideably and/or pivotably mounted to the supporting unit so as to allow the frame and the associated coupling device to slide and/or pivot in relation to the supporting unit.

12 Claims, 7 Drawing Sheets

CONNECTION ARRANGEMENT FOR SUBSEA CONNECTION OF FLUID CONDUITS

FIELD OF THE INVENTION AND PRIOR ART

The present invention relates to a connection arrangement for subsea connection of at least a first fluid conduit, such as a pipeline or flow-line, to a second fluid conduit, such as a riser pipe or pipe spool, the connection arrangement comprising:

a supporting unit for displaceably supporting the connection arrangement against a supporting surface, such as the seabed or a seabed-based foundation; and a coupling device provided with coupling means for coupling and securing said fluid conduits to the connection arrangement so as to thereby interconnect the fluid conduits to each other.

In this description and the subsequent claims, the term "fluid" refers to a flowing medium in gaseous or liquid form. Consequently, the expression "fluid conduit" implies a conduit that may convey liquids as well as gases.

Development within offshore oil and gas exploration in the recent years has been directed to subsea installations for production of oil and gas. These subsea installations are commonly tied back to platforms, to which oil and gas are transported for further processing and export. This development of subsea installations has resulted in an increasing need for connection arrangements for interconnecting two or more fluid conduits at or near the seabed, for instance in order to connect a longer pipeline or flow-line installed on the seabed to a flexible riser or other pipe spool.

A seabed-based pipeline or flow-line, i.e. a pipeline or flow-line arranged on the seabed, for conveying well fluids emanating from a subsea well may extend several kilometers along the seabed and normally has a very high weight and stiffness, which makes it very difficult to pull the pipeline or flow-line termination along the seabed. A connection arrangement for facilitating the connection of a seabed-based pipeline or flow-line to another fluid conduit, such as flexible riser pipe, is previously known from U.S. Pat. No. 6,312,193 B1. This previously known connection arrangement is provided with a sledge-like supporting unit, by means of which the connection arrangement is to be displaceably supported against the seabed. The known connection arrangement is intended to be located on the seabed close to a pipeline/flow-line termination, whereupon the connection arrangement is pulled towards the pipeline/flow-line termination by means of a winch included in a connecting tool that is temporarily secured at an end of the connection arrangement. After having coupled and secured the pipeline/flow-line termination hub to a corresponding hub of the connection arrangement, the connecting tool is repositioned to the other end of the connection arrangement and used to pull the termination of the other fluid conduit towards the connection arrangement, whereupon the termination hub of this fluid conduit is coupled and secured to a corresponding hub of the connection arrangement. Owing to the fact that the connection arrangement is allowed to slide on the seabed into contact with the pipeline/flow-line termination, no traditional tie-in spool spanning between the pipeline/flow-line termination and the connection arrangement has to be provided in order to complete the connection between the pipeline/flow-line and the connection arrangement, which implies that the use of this type of displaceable connection arrangement will reduce the time expenditure and costs for the connection operation as compared to the use of a traditional connection arrangement that is connected to a pipeline or flow-line via a tie-in spool after having been installed on the seabed.

SUMMARY OF THE INVENTION

The object of the present invention is to achieve a further development of a displaceable connection arrangement of the above-indicated type so as to provide a connection arrangement that is improved in at least some aspect.

In contrast to the connection arrangement according to U.S. Pat. No. 6,312,193 B1, where the coupling device is immovably secured to the displaceable supporting unit, the inventive connection arrangement is provided with a coupling device carried by a frame which is slideably and/or pivotably mounted to the displaceable supporting unit so as to allow the frame and the associated coupling device to slide and/or pivot in relation to the supporting unit. Owing to this movability of the coupling device in relation to the supporting unit, the forces and moments required for properly aligning the termination of a heavy and stiff pipeline or flow-line and the coupling device of the connection arrangement will be reduced.

According to a preferred embodiment of the invention, the frame is pivotably mounted to the supporting unit so as to allow the frame and the associated coupling device to pivot in relation to the supporting unit about a horizontal axis. Hereby, the coupling device may be tilted to suit the free span angle of a pipeline or flow-line end that is lifted from the seabed in order to be brought into contact with the coupling device.

According to another embodiment of the invention, the frame is pivotably mounted to the supporting unit so as to allow the frame and the associated coupling device to pivot in relation to the supporting unit about a vertical axis. Hereby, the coupling device may be pivoted about the vertical axis to suit the approach angle of a pipeline or flow-line end that is to be brought into contact with the coupling device.

Further advantages as well as advantageous features of the inventive connection arrangement will appear from the following description and the dependent claims.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

FIGS. 1-5 illustrate a connection arrangement 1 according to an embodiment of the present invention for subsea connection of a first fluid conduit, such as a pipeline or flow-line, to a second fluid conduit, such as a flexible riser pipe or a pipe spool. The connection arrangement 1 comprises a coupling device 10 provided with coupling means 11 for coupling and securing said fluid conduits to the connection arrangement 1 so as to thereby interconnect the fluid conduits to each other. The coupling device 10 is carried by a frame 20 which, in the illustrated example, is slideably and pivotably mounted to a supporting unit 30 so as to allow the frame 20 and the coupling device 10 to slide and pivot in relation to the supporting unit 30, at least when an operation of coupling said first conduit to the connection arrangement is carried out. The coupling device 10 is rigidly secured to the frame 20. The connection arrangement 1 is displaceably supported against a supporting surface, such as the seabed or a seabed-based foundation, by the supporting unit 30 so as to allow the entire connection arrangement 1 to slide along the supporting surface via the supporting unit 30.

The supporting unit 30 is suitably designed as a sledge, as illustrated in FIGS. 1-5. In the illustrated example, the supporting unit 30 comprises two parallel ski-like sliding members 31a, 31b, which are rigidly secured to each other by means of cross beams 32-35 (see FIG. 5). The supporting unit 30, and thereby the entire connection arrangement 1, rests against an underlying supporting surface, such as the seabed, via the sliding members 31a, 31b.

In the illustrated example, the coupling means 11 of the coupling device comprises a first hub 12a designed to mate with a termination hub of said first fluid conduit and a second hub 12b designed to mate with a termination hub of said second fluid conduit. The coupling means 11 also comprises a first clamping member 13a arranged at said first hub 12a for clamping together the first hub 12a and the termination hub of said first fluid conduit, and a second clamping member 13b arranged at said second hub 12b for clamping together the second hub 12b and the termination hub of said second fluid conduit. The first and second hubs 12a, 12b are arranged at opposite ends of the coupling device 10 and are connected to each other via an interconnecting pipe 14 included in the coupling device. Furthermore, the coupling device 10 may be provided with a valve unit 15, by means of which the fluid communication between the first hub 12a and the second hub 12b is interruptable. In the illustrated example, such a valve unit 15 is provided in the interconnecting pipe 14 between the hubs 12a, 12b. In the illustrated example, the coupling device 10 is also provided with an actuator 16 (optional) for controlling the valve unit 15. The actuator 16 is with advantage remotely controlled. The actuator 16 is preferably removably secured to the valve unit 15 so as to allow the actuator to be disconnected from the valve unit 15 and retrieved to the surface, e.g. for maintenance or repair. A defective actuator 16 may also be removed and replaced by a new actuator. In the illustrated example, the frame 20 is provided with guide post receptacles 21a, 21b arranged on opposite sides of the frame 20 so as to be located on either side of the actuator 16. The respective guide post receptacle 21a, 21b is intended to receive a guide post 22a, 22b (see FIG. 5), by means of which a submersible tool may be guided into engagement with the connection arrangement 1 in order to remove an installed actuator 16 or install a new actuator.

The frame 20 is suitably provided with at least one trunnion, by means of which the frame 20 is pivotably mounted to the supporting unit 30. In the illustrated example, the frame 20 is provided with two trunnions 23a, 23b arranged opposite each other on opposite sides of the frame 20 and the supporting unit 30 is provided with holders 36a, 36b for receiving the trunnions 23a, 23b. Each trunnion 23a, 23b is slideably and pivotably received in the associated holder 36a, 36b so as to allow the frame 20 and the associated coupling device 10 to slide and pivot in relation to the supporting unit 30. The respective trunnion 23a, 23b is received in a guiding groove or slot 37a, 37b arranged in the associated holder 36a, 36b. Low friction bearings are arranged to reduce the friction forces between the trunnions 23a, 23b and the internal walls of the guiding slots 37a, 37b. Each holder 36a, 36b may be rigidly secured to a sliding member 31a, 31b of the supporting unit 30, as illustrated in FIGS. 1-5. In the illustrated example, each holder 36a, 36b is designed as a yoke protruding on the upper side of the associated sliding member 31a, 31b. The trunnions 23a, 23b, and thereby also the frame 20 and the coupling device 10, may pivot about a horizontal pivot axis 25 coinciding with the centre axes of the trunnions. The respective trunnion 23a, 23b may also slide along a sliding surface 38a, 38b provided on the supporting unit 30 so as to thereby allow the frame 20 and the coupling device 10 to slide in the longitudinal direction in relation to the supporting unit 30 and to pivot in relation to the supporting unit 30 about a vertical axis.

The displacement of the respective trunnion 23a, 23b in the longitudinal direction of the supporting unit 30 is restricted by the associated holder 36a, 36b. The holders 36a, 36b also prevent the trunnions 23a, 23b and thereby the frame 20 from being lifted away from the supporting unit 30. Stopping members 24a, 24b are arranged on the frame 20 on either side of the horizontal pivot axis 25 formed by the trunnions 23a, 23b in order to restrict the tilting angle between the frame 20 and the supporting unit 30. In the illustrated example, the respective stopping member 24a, 24b is constituted by a cross beam extending across the frame 20 and protruding on either longitudinal side of the frame. The respective stopping member 24a, 24b is arranged to come into contact with abutment surfaces 39 on the supporting unit 30 when the frame 20 has been tilted a certain angle in relation to the supporting unit so as to thereby prevent further tilting of the frame in the same direction. When in contact with the associated abutment surfaces 39, the stopping member 24a, 24b is allowed to slide along the abutment surfaces so as to allow the frame 20 to be displaced in the longitudinal direction of the supporting unit 30 and to be pivoted in relation to the supporting unit about a vertical axis.

The connection arrangement 1 is suitably provided with locking means, by means of which the frame 20 is lockable to the supporting unit 30 in such a manner that the relative movements between the frame 20 and the supporting unit 30 are restrained. In the illustrated example, said locking means comprises curved locking arms 40a, 40b, which are rigidly secured to the supporting unit 30 and designed to engage one of the stopping members 24a. The stopping member 24a in question may be displaced, together with the frame 20, into a locking position in engagement with the locking arms 40a, 40b and locked thereto by mechanical locking members 41a, 41b arranged on the supporting unit 30. The locking members 41a, 41b are suitably releasable so as to allow the stopping member 24a to be released from the locking arms 40a, 40b.

Figure 1:
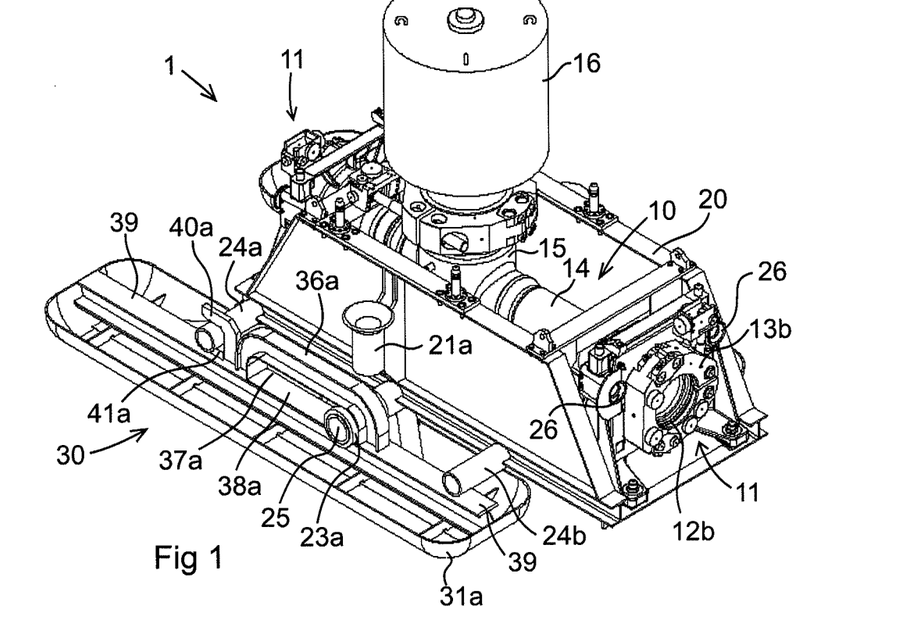
FIG. 1 is a perspective view of a connection arrangement according to an embodiment of the present invention.
Figure 2:
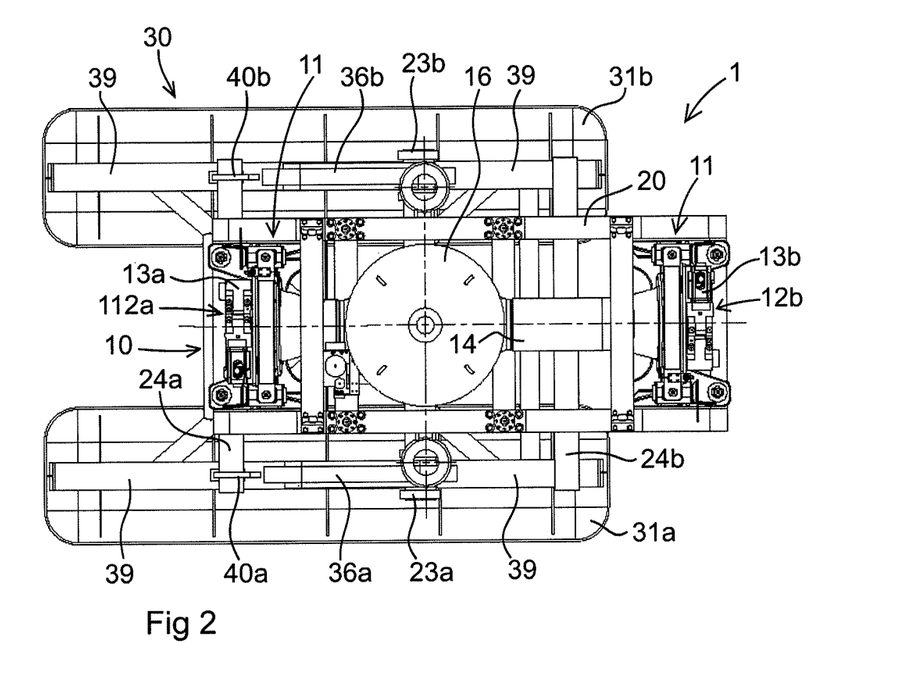
FIG. 2 is a planar view from above of the connection arrangement of FIG. 1.
Figure 3:
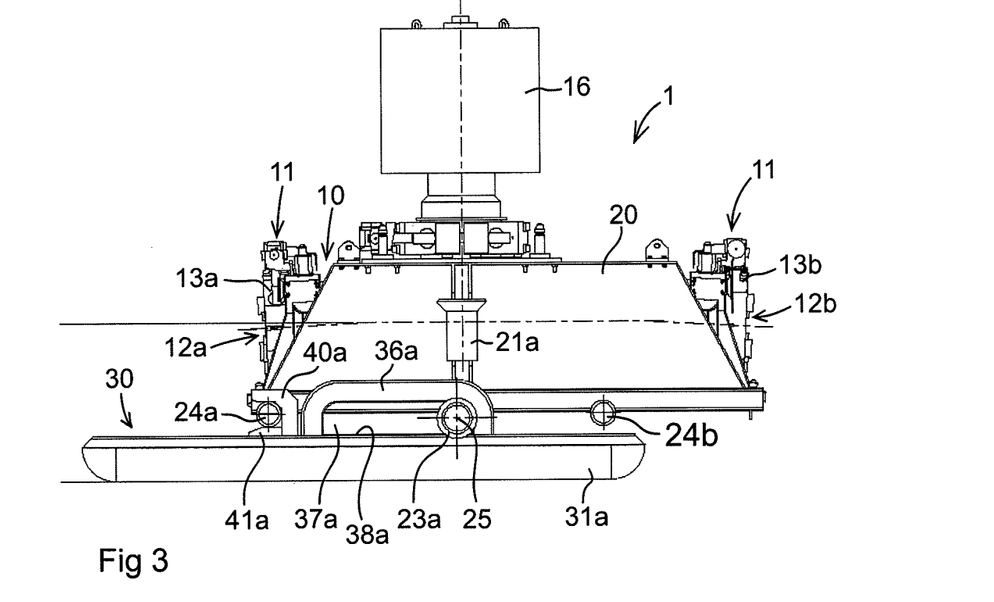
FIG. 3 is a lateral view of the connection arrangement of FIG. 1.
Figure 4:
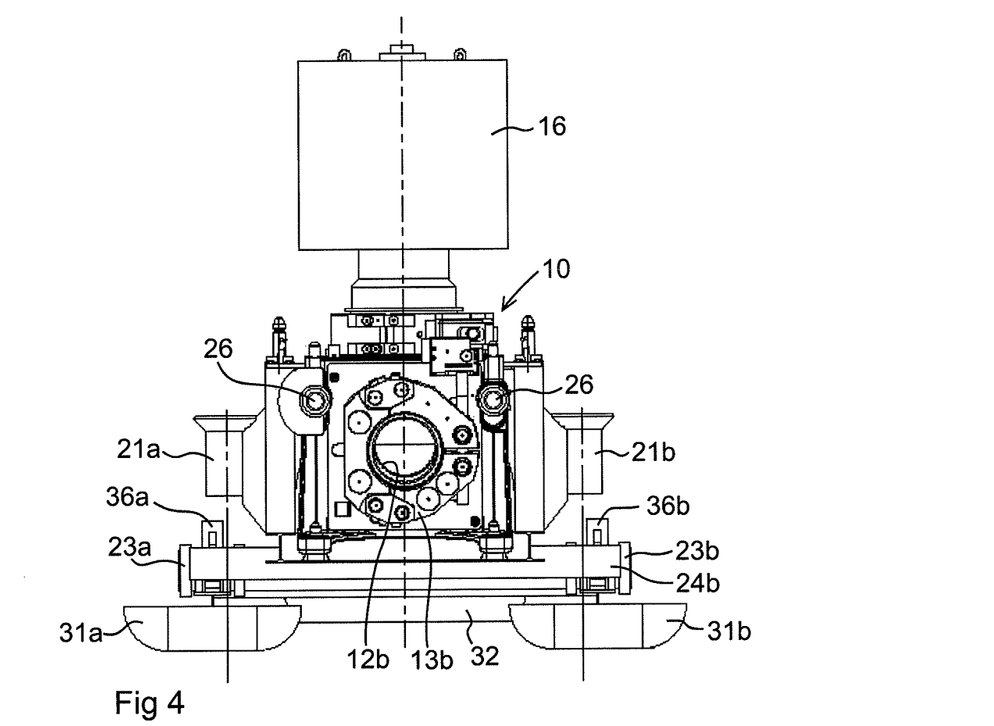
FIG. 4 is a frontal view of the connection arrangement of FIG. 1.
Figure 5:
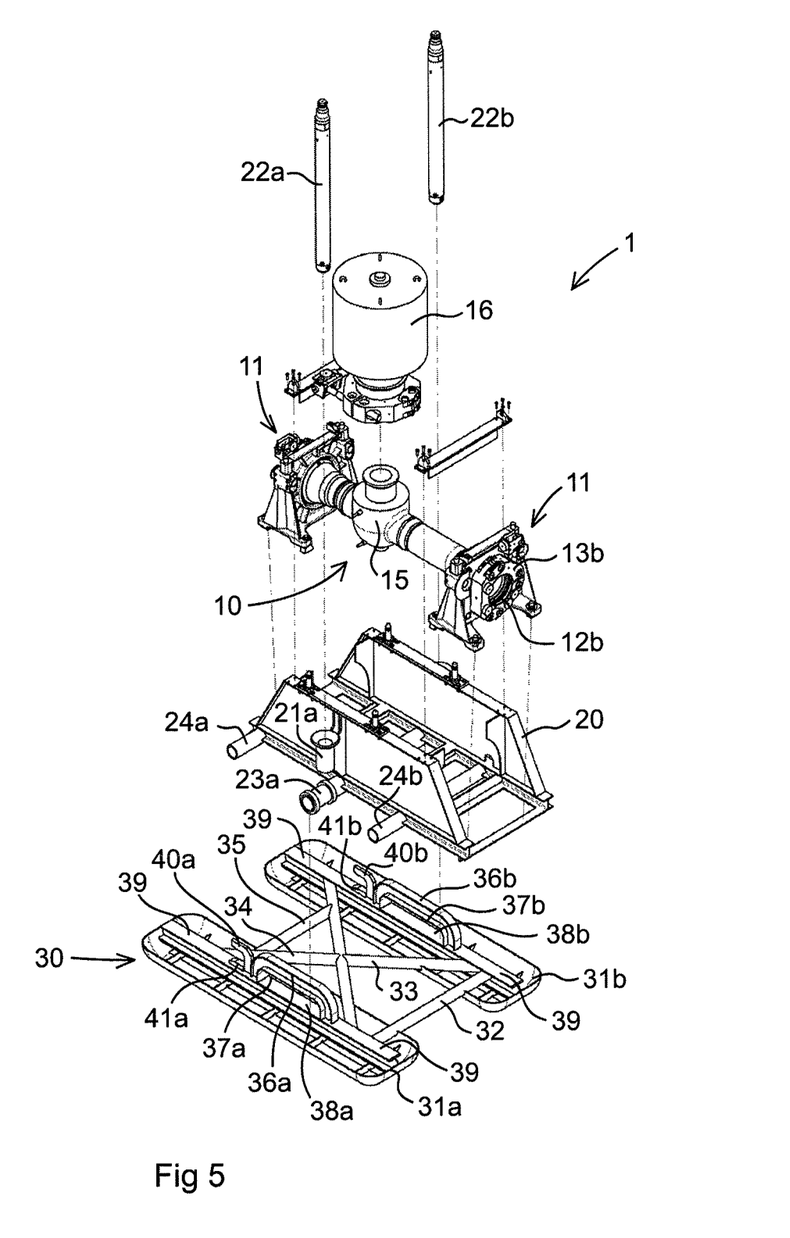
FIG. 5 is an exploded view of the connection arrangement of FIG. 1, FIGS. 6a-g are perspective views of the connection arrangement of FIG. 1 illustrating different stages in an operation of interconnecting two fluid conduits.
Figure 6A:
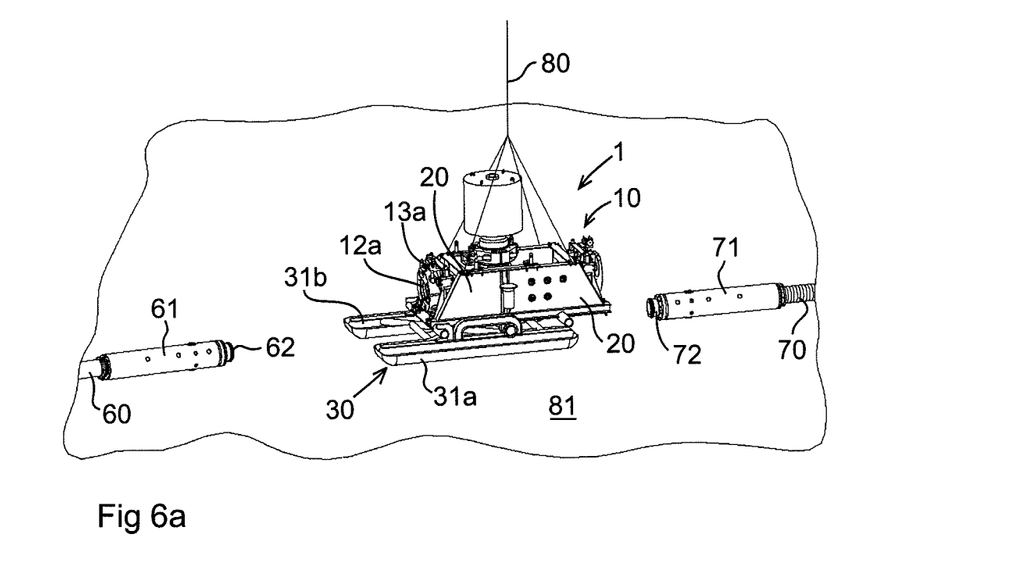
Figure 6B:
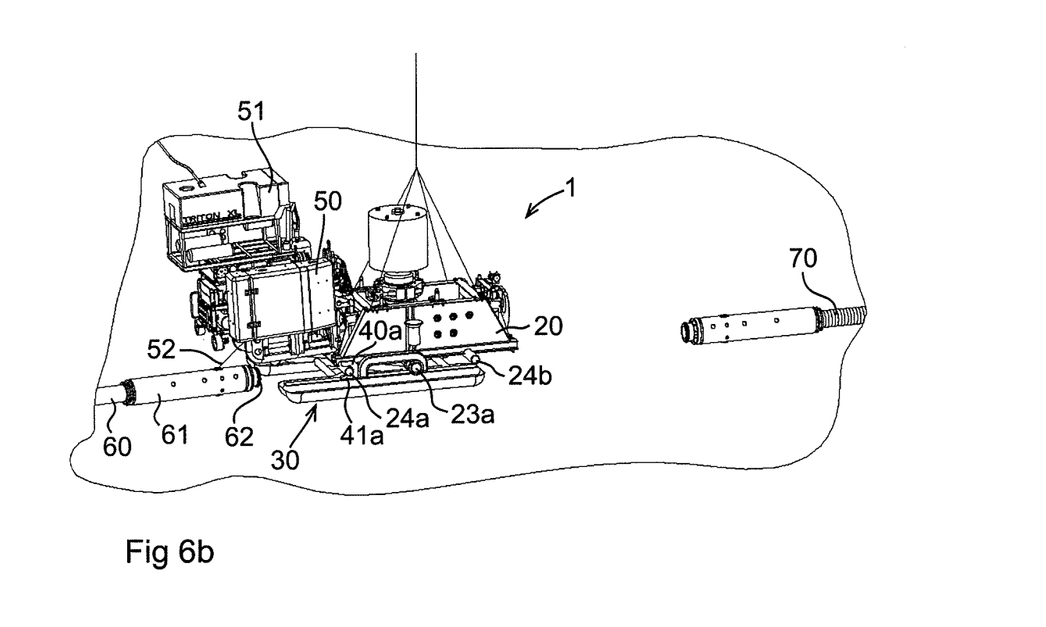
Figure 6C:
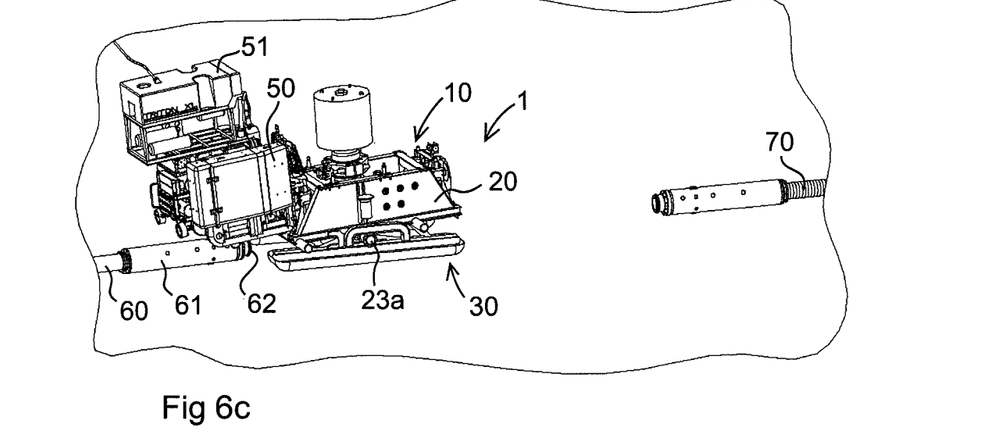
Figure 6D:
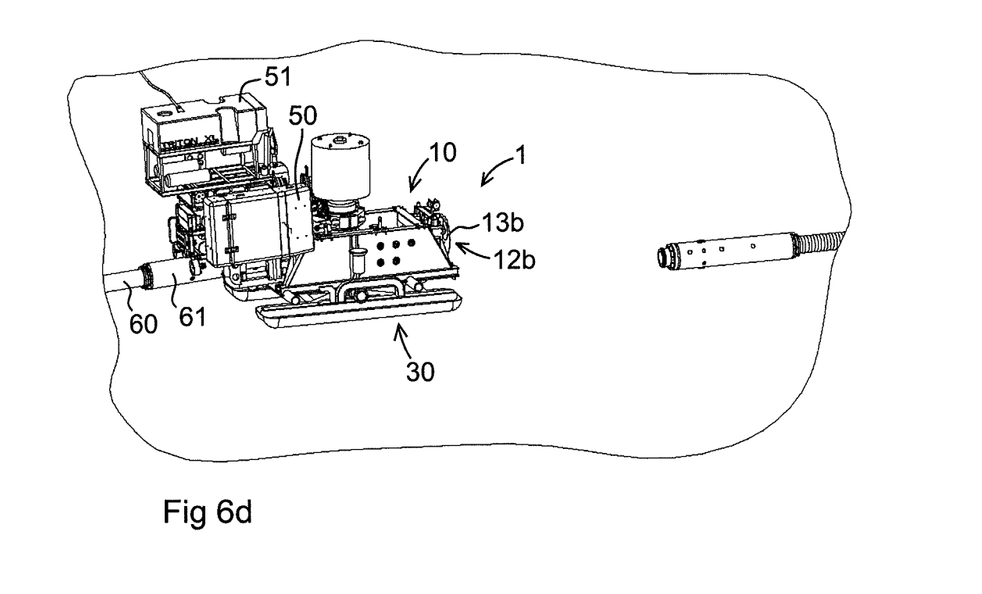
Figure 6E:
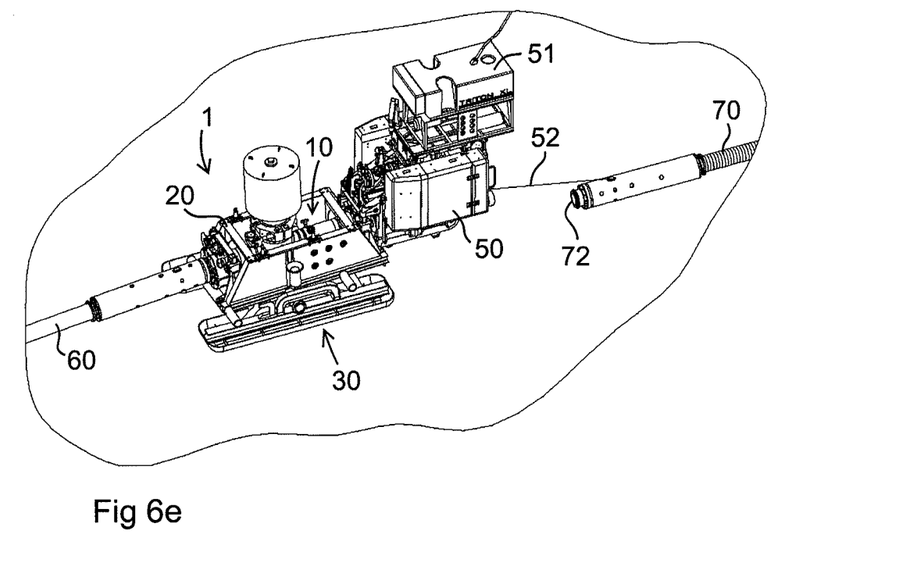
Figure 6F:
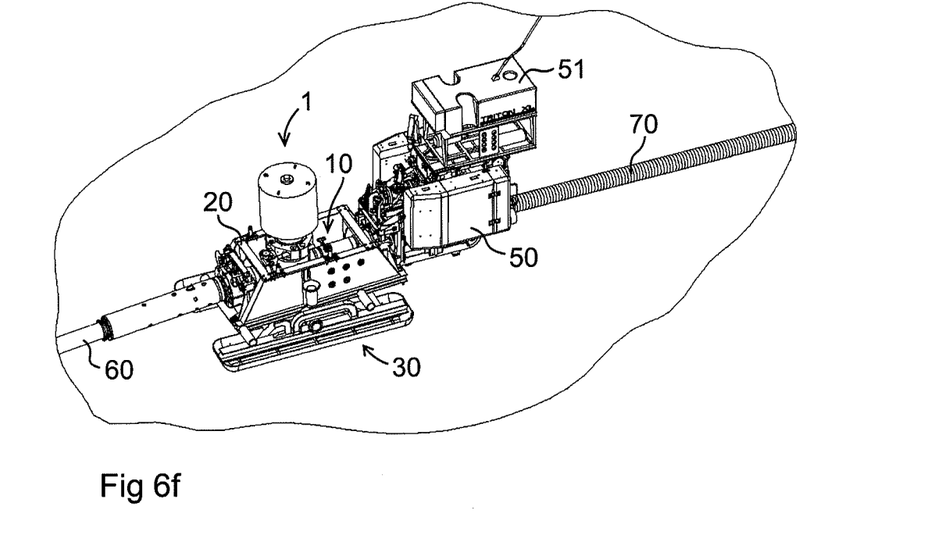
Figure 6G:
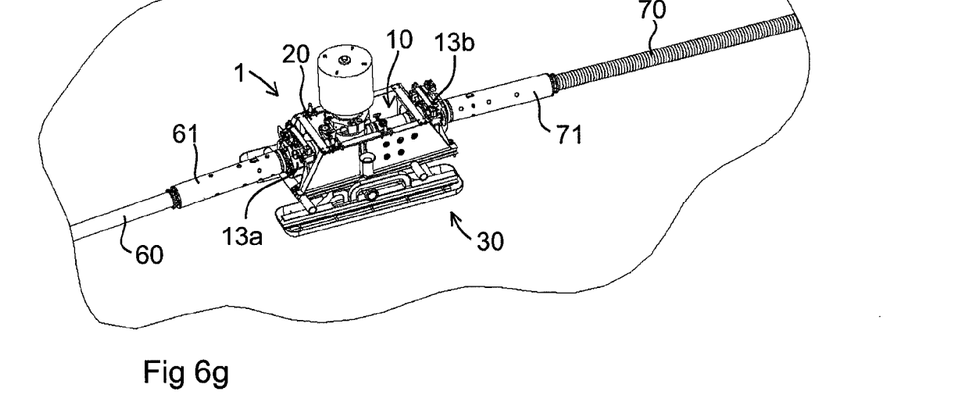

The frame 20 or the coupling device 10 is designed to receive a submersible and remotely operated connecting tool 50 (see FIGS. 6b-6f) provided with force applying means for pulling the connection arrangement 1 towards said first fluid conduit 60, as illustrated in FIG. 6b, or pulling said second fluid conduit 70 towards the connection arrangement, as illustrated in FIG. 6e. The frame 20 or the coupling device 10 is provided with guiding means 26 designed to co-operate with corresponding guiding means on the connecting tool 50 so as to guide the connecting tool into a correct position in relation to the coupling device 10 when the connecting tool is brought into contact with the frame 20 or the coupling device 10.

FIGS. 6a-6g illustrate different stages in an operation of interconnecting two fluid conduits 60, 70 by means of a connection arrangement 1 according to FIGS. 1-5.

The connection arrangement 1 is lowered into the sea, e.g. by means of wires 80 attached to the connection arrangement 1 from a surface vessel, and it is lowered downwards onto the seabed 81 so as to come to bear against the seabed in front of a termination 61 of a first fluid conduit 60, e.g. in the form of a pipeline or flow-line, which is laying on the seabed (see FIG. 6a). During this initial stage, the frame 20 of the connection arrangement 1 is locked to the supporting unit 30 by the locking means 40a, 40b, 41a, 41b. A connecting tool 50 is then docketed to the coupling device 10 of the connection arrangement 1 by means of an ROV 51 (Remotely Operated Vehicle). A pull-in wire 52, which is connected to a winch included in the connecting tool 50, is pulled out and secured to the conduit termination 61, e.g. by means of an ROV. Thereupon, the winch is actuated to reel in the pull-in wire 52 so as to thereby pull the connection arrangement 1 towards the conduit termination 61 with the connection arrangement 1 sliding on the seabed via the sliding members 31a, 31b of the supporting unit 30 (see FIG. 6b). When the conduit termination hub 62 is at a suitable distance, e.g. about 0.5-1 meter, from the corresponding hub 12a of the coupling device 10, the winch is stopped and the locking members 41a, 41b are opened so as to allow the frame 20 to move in relation to the supporting unit 30. The winch is then actuated to lift up the conduit termination 61, while the frame 20 and the coupling device 10 tilt in relation to the supporting unit 30 to suit the free span angle of the first conduit 60 and pivot in relation to the supporting unit 30 about a vertical axis to suit the approach angle of the first conduit 60 (see FIG. 6c). A stroking mechanism included in the connecting tool 50 is then actuated to make the conduit termination hub 62 and the corresponding hub 12a of the coupling device mutually mated (see FIG. 6d). During this mating of the hubs 62, 12a, the frame 20 will slide in relation to the supporting unit 30 in the longitudinal direction so as to allow the hub 12a to move into engagement with the conduit termination hub 62. When the mating operation is completed, a torque applying device included in the connecting tool 50 is made to actuate the clamping member 13a so as to clamp together the conduit termination hub 62 and the hub 12a of the coupling device 10, whereupon a seal test is performed to verify proper sealing between the hubs 62, 12a. The connecting tool 50 is then relocated to the other end of the coupling device 10 by means of the ROV 51. The pull-in wire 52 is pulled out and secured to the termination 71 of a second conduit 70, e.g. in the form of a flexible riser pipe. Thereupon, the winch is actuated to reel in the pull-in wire 52 so as to thereby pull the conduit termination 71 towards the connection arrangement 1 (see FIG. 6e). The stroking mechanism of the connecting tool 50 is then actuated to make the conduit termination hub 72 and the corresponding hub 12b of the coupling device mutually mated (see FIG. 6f). When the mating operation is completed, the torque applying device of the connecting tool 50 is made to actuate the clamping member 13b so as to clamp together the conduit termination hub 72 and the hub 12b of the coupling device 10, whereupon a seal test is performed to verify proper sealing between the hubs 72, 12b. The connection operation is now completed and the connecting tool 50 may be retrieved to the surface by means of the ROV 51.

Figure 7:
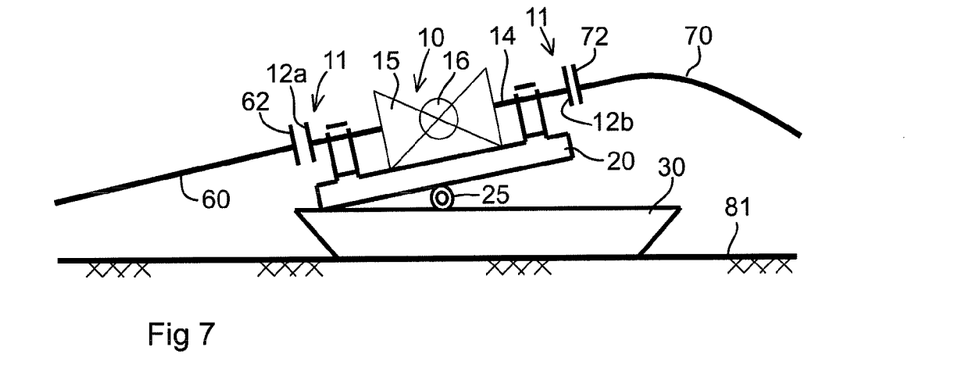
FIG. 7 is a very schematic lateral view of a connection arrangement according to the present invention connected to two fluid conduits.

FIG. 7 schematically illustrates how the frame 20 and the coupling device 10 of the connection arrangement 1 has been tilted in relation to the supporting unit 30 about a horizontal axis 25 to suit the free span angle of said first fluid conduit 60.

Figure 8:
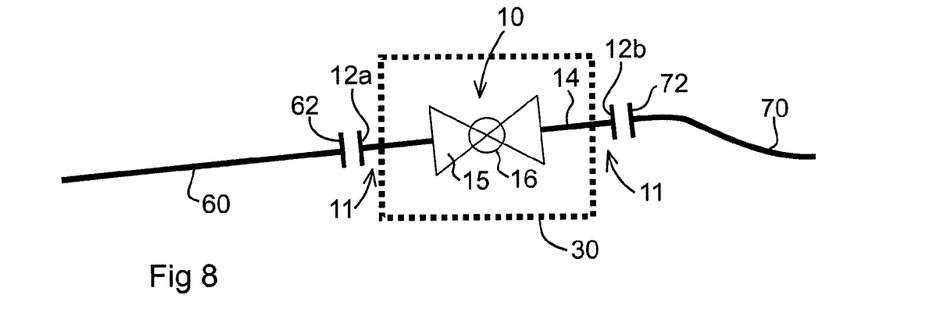
FIG. 8 is a very schematic planar view of a connection arrangement according to the present invention connected to two fluid conduits.

FIG. 8 schematically illustrates how the coupling device 10 of the connection arrangement 1 has been pivoted in relation to the supporting unit 30 about a vertical axis to suit the approach angle of the first fluid conduit 60.

The inventive connection arrangement may of course also be used for connecting other types of fluid conduits than here illustrated. The connection arrangement according to the present invention may for instance be used for connecting a rigid pipeline to a rigid pipe spool. In the latter case, the connection arrangement may be referred to as a PLET (Pipeline End Termination). The connection operation may also be performed in other manners than illustrated in FIGS. 6a-6g. If the connection arrangement 1 is to be connected to fluid conduits by divers, the mechanical clamping members 13a, 13b may be replaced by flanges or any other suitable attachment members.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A connection arrangement for subsea connection of at least a first fluid conduit comprising a first termination hub to a second fluid conduit comprising a second termination hub, the connection arrangement comprising:
   a supporting unit designed as a sledge for displaceably supporting the connection arrangement against a seabed so as to allow the entire connection arrangement to slide along the seabed via the supporting unit by sliding the supporting unit on the seabed;
   a coupling device configured to couple and secure said fluid conduits to the connection arrangement so as to thereby interconnect the fluid conduits to each other, the coupling device comprising an interconnecting pipe, a first hub configured to mate with the first termination hub, a second hub configured to mate with the second termination hub, a first clamping member arranged at the first hub to clamp together the first hub and the first termination hub, and a second clamping member arranged at the second hub to clamp together the second hub and the second termination hub, the first hub and the second hub being arranged at opposite ends of the coupling device and being connected to each other via the interconnecting pipe; and
   a frame configured to carry the coupling device, the frame being slideably and pivotably mounted to the supporting unit so as to allow the frame and the associated coupling device to slide and pivot in relation to the supporting unit.

2. The connection arrangement according to claim 1, wherein the frame is pivotably mounted to the supporting unit so as to allow the frame and the associated coupling device to pivot in relation to the supporting unit about a horizontal axis.

3. The connection arrangement according to claim 1, wherein the frame is pivotably mounted to the supporting unit so as to allow the frame and the associated coupling device to pivot in relation to the supporting unit about a vertical axis.

4. The connection arrangement according to claim 1, wherein the frame comprises at least one trunnion configured to pivotably mount the frame to the supporting unit.

5. The connection arrangement according to claim 4, wherein the frame comprises two trunnions arranged opposite each other on opposite sides of the frame, and wherein the supporting unit comprises holders for receiving the trunnions, each trunnion being slideably and pivotably received in the associated holder so as to allow the frame and the associated coupling device to slide and pivot in relation to the supporting unit.

6. The connection arrangement according to claim 5, wherein the respective trunnion is received in a guiding groove arranged in the associated holder.

7. The connection arrangement according to claim 1, wherein the connection arrangement comprises a lock configured to lock the frame to the supporting unit in such a manner that the relative movements between the frame and the supporting unit are restrained.

8. The connection arrangement according to claim 1, wherein the coupling device comprises a valve unit configured to interrupt the fluid communication between said fluid conduits, when coupled and secured to the connection arrangement by the coupling device.

9. The connection arrangement according to claim 8, wherein the coupling device further comprises a retrievable actuator for controlling the valve unit.

10. The connection arrangement according to claim 1, wherein the first fluid conduit comprises a pipeline or flowline.

11. The connection arrangement according to claim 1, wherein the second fluid conduit comprises a riser pipe or pipe spool.

12. The connection arrangement according to claim 1, wherein the frame comprises two trunnions arranged opposite each other on opposite sides of the frame, wherein the supporting unit comprises holders for receiving the trunnions, each trunnion being slideably and pivotably received in the associated holder so as to allow the frame and the associated coupling device to slide and pivot in relation to the supporting unit, and wherein the respective trunnion is received in a guiding groove arranged in the associated holder.

* * * * *

UNITED STATES PATENT AND TRADEMARK OFFICE
CERTIFICATE OF CORRECTION

| | | |
|---|---|---|
| PATENT NO. | : 8,408,842 B2 | Page 1 of 1 |
| APPLICATION NO. | : 11/922228 | |
| DATED | : April 2, 2013 | |
| INVENTOR(S) | : Cafaro et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this
Thirtieth Day of September, 2014

Michelle K. Lee
*Deputy Director of the United States Patent and Trademark Office*